May 14, 1957 F. W. TESKE 2,792,098
DEVICE FOR PICKING UP AND CONVEYING MATERIAL
Filed Jan. 5, 1953 2 Sheets-Sheet 1
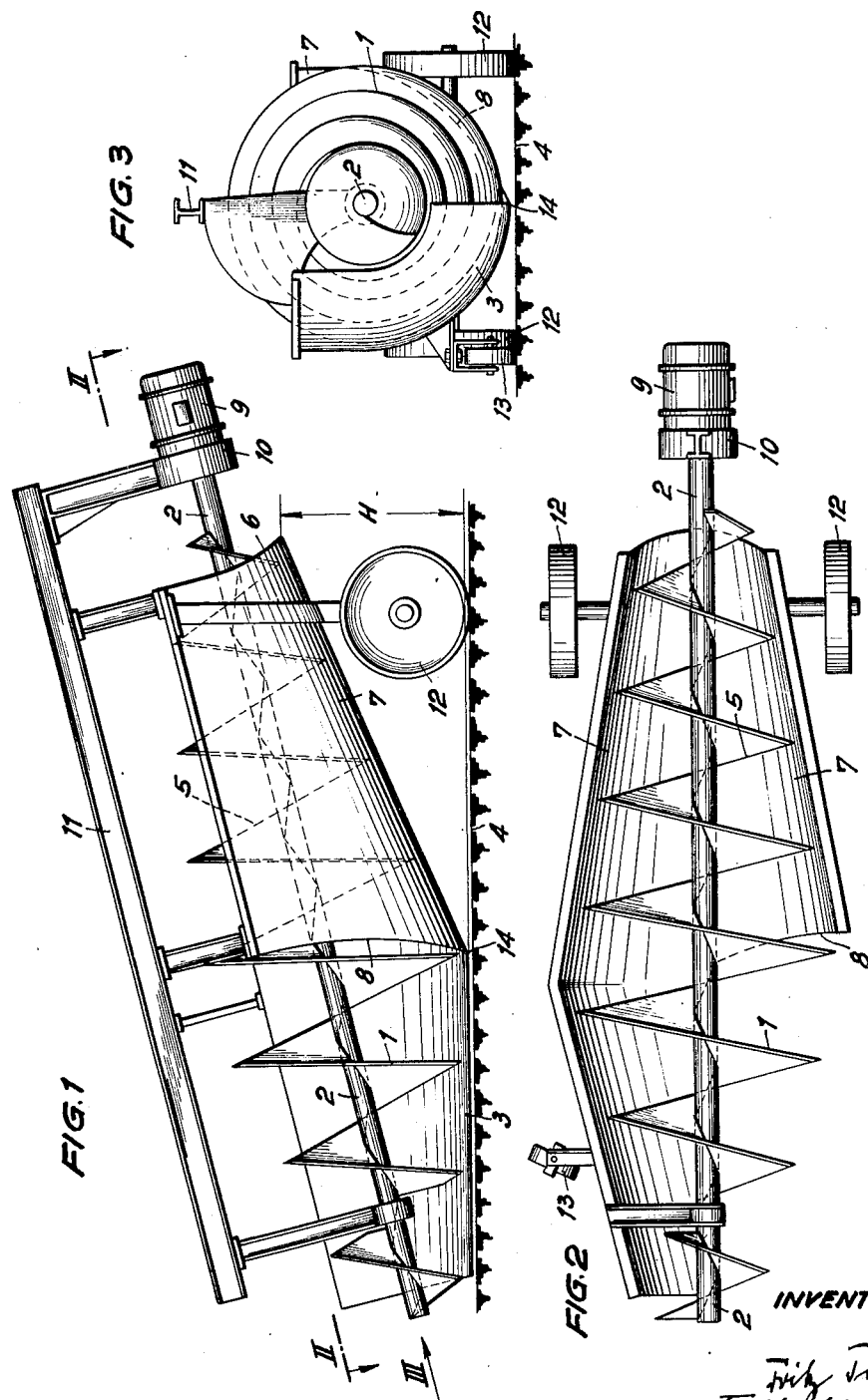
INVENTOR
Fritz W. Teske
By Ralli Berler
Patent Agent May 14, 1957  F. W. TESKE  2,792,098
DEVICE FOR PICKING UP AND CONVEYING MATERIAL
Filed Jan. 5, 1953  2 Sheets-Sheet 2
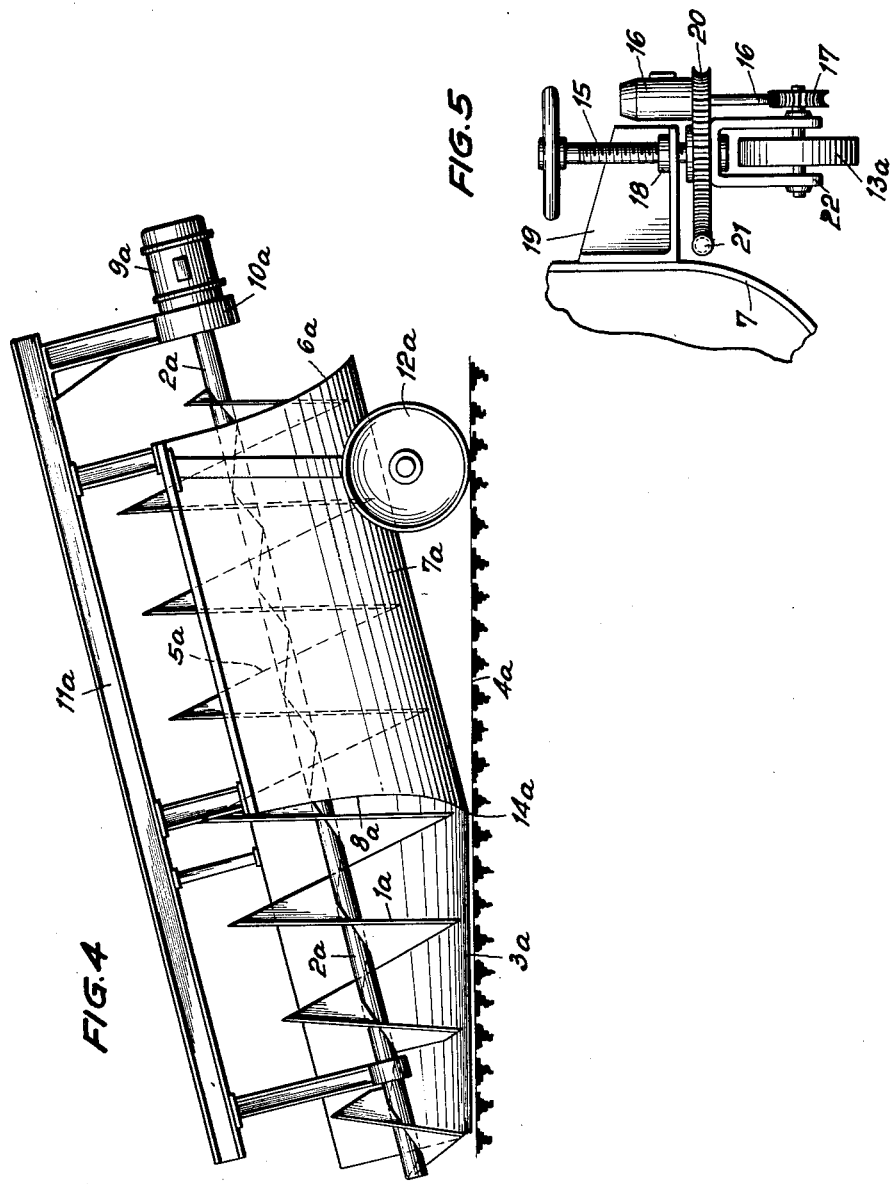
INVENTOR
Fritz W. Teske
By
Patent Agent

United States Patent Office 2,792,098
Patented May 14, 1957

2,792,098

DEVICE FOR PICKING UP AND CONVEYING MATERIAL

Fritz W. Teske, Koln-Weidenpesch, Germany

Application January 5, 1953, Serial No. 329,686

4 Claims. (Cl. 198—7)

The present invention relates to conveying means and, more particularly, to a device for automatically picking up and conveying material, especially loose material such as soil, gravel, briquettes, stones, coal and the like.

It is known to employ screw conveyors for automatically conveying loose material from dumps, piles, and the like to a vehicle or other containers. To this end, there has, for instance, been used a feeding or conveyor screw supported in cantilever fashion and arranged on a carriage or the like. When in operation, the said feeding or conveying screw bores itself like a cork screw into the material. In order that a conveying action will occur, the front end of the feeding screw is provided with a stabilization surface by means of which the conveying screw is prevented from farther entering into the pile. The conveying screw is cylindrical and has no trough arranged for cooperation therewith. A picking up of the material from the ground is not possible. It is also known to arrange conveying screws rectangularly to each other in the manner of a T, while providing the screw for picking up the material with two counter-running screw sections by means of which the material is crowded together toward the central part, whereupon an upwardly inclined conveying screw conveys the material upwardly. The said picking up screw may also, if desired, be arranged so that its longitudinal axis is an extension of the longitudinal axis of the upwardly inclined screw. With this known arrangement, all feeding and conveying screws are cylindrical. However, this type of conveying equipment is awkward, cumbersome, and bulky. The picking up screw has a considerable length and requires much space.

Another known movable loader for bulk goods is so designed that a cone-shaped tapering screw without trough is followed by a bucket or scoop wheel provided with individual buckets. These buckets are adapted to pass over an inclined cylindrical screw by means of which the goods are lifted. Inasmuch as the tapering screw is without a trough, it is not adapted to act as a conveying means unless a pile of the loose material rests thereupon. The screw merely burrows without pushing, i. e., without feeding. Such type of screw is fully inapt to pick up only slightly piled up goods. In addition thereto, the bucket wheel complicates the entire assembly and makes the same too expensive.

It is, therefore, an object of this invention to provide a simplified loader which will overcome the above mentioned drawbacks.

It is another object of this invention to provide a movable conveying device including conveying screw means which, while requiring only a minimum of space, is adapted to pick up the material directly from the ground at the very start of the conveying screw, irrespective of the height of the material.

It is a further object of this invention to provide a movable loader of the type set forth in the preceding paragraph, which will be adapted after a rather short conveying distance to lift the material to a considerable height sufficient to unload the said material directly into standard trucks or the like.

A still further object of this invention consists in the provision of an improved movable loader including conveying screw means which has a section effective both as picking up and conveying screw, while the device itself is rather short, easy to handle, and can easily be turned and stored.

These and other objects and advantages of the invention will appear more clearly from the following specification in connection with the accompanying drawings in which:

Fig. 1 is a side view of the picking up and conveying device according to the present invention.

Fig. 2 is a section taken along the line II—II of Fig. 1.

Fig. 3 illustrates a front view of the device according to the invention as seen in the direction of the arrow III.

Fig. 4 is a slight modification over the arrangement of Fig. 1.

Fig. 5 is a lifting mechanism for the front portion of the device and also shows a front wheel control mechanism.

General arrangement

The movable loader according to the present invention is primarily characterized in that the conveying screw comprises a double purpose section which widens conically in the direction of the discharge and acts both as picking up and as conveying means, while it has a casing adjacent and alongside thereto. This casing has an opening on one side and has the lower edge at said open portion extending along the ground. Preferably, the said combined picking up and conveying section of the conveying screw is joined at its wider end by a second screw section which acts as conveying means only and may either be cylindrical or may taper toward the discharge end, while the casing extends adjacent to and also along the second section. Both screw sections are preferably integral with each other, but, if desired, may also constitute two separate members.

The device according to the present invention has the advantage that the screw, while requiring only a minimum of space, is adapted to pick up the material from the start of the screw and directly at the ground, irrespective of whether or not the loose material to be conveyed is piled up or not. The device according to the invention completely and in a clean manner picks up the material from the ground, i. e. also material loosely lying around is picked up and conveyed by the device of this invention. No holes or slopes are created by this new loader so that the device may be passed over any even or uneven, hard or soft ground over which it rakes with its receiving opening. By means of the above mentioned second conveying screw section it is possible after a short conveying distance to obtain a considerable height for the discharge end of the conveying screw so that standard vehicles such as trucks can drive below and may be loaded directly from said discharge opening.

Furthermore, the loader according to the invention is compact and easy to handle. Depending on the respective requirements, the receiving opening of the front cone-shaped part of the screw casing may be arranged at one or the other side. If the receiving opening is at the left side with regard to a person standing behind the loader, the screw is driven leftwardly and upwardly, whereas, when the receiving opening is on the right hand side, the screw is driven rightwardly and upwardly. The compactness of the loader assures an easy storing thereof.

Structural arrangement

Referring now to the drawings in detail, the arrangement according to the invention illustrated therein for picking up and conveying loose material of any type, substantially comprises a receiving or picking up screw 1 which is cone-shaped throughout its picking up length so that the screw diameter increases in the feeding direction. The shaft 2 of the screw 1 is arranged in an inclined manner in such a way that the lowermost edge points of the spirals of screw 1 are located on a substantially straight line 3 substantially parallel to the adjacent ground surface 4. Joined to the receiving or picking up screw 1 is a screw 5. However, while screw 1 acts both as a picking up and conveying screw, screw 5 acts as conveying screw only. Conveying screw 5 is preferably likewise cone-shaped but in such a manner that it tapers toward the discharge end 6. Due to this arrangement, the discharge 6 already after a short conveying distance reaches a considerable height H above the ground so that vehicles or the like can be placed directly below the discharge end 6 for loading purposes. The spirals of screws 1 and 5 cooperate with a correspondingly shaped casing 7 arranged adjacent thereto and having at its front end a receiving opening 8 which extends over the picking up screw 1 towards one side thereof. The shaft 2 which carries both the screw 1 and the screw 5 may be driven directly by a flanged motor 9 and is supported by a frame construction 11.

While according to the arrangement shown in the drawings the receiving opening 8 is on the left hand side of the device when seen from the discharging end 6, it is, of course, also possible instead to arrange the receiving opening 8 at the right hand side of the device. Depending on whether the opening 8 is on the left hand or on the right hand side, the motor 9 will drive the shaft 2 leftwardly or rightwardly respectively.

Advantageously, the device is mounted on a carriage having a pair of rear wheels 12, and one front wheel 13 arranged on that side of the device which is opposite the receiving opening 8. In this way, the device may be moved back and forth and may be turned about the rear wheels 12.

The device may also be provided with means adapted automatically to press the device against the pile or the like of the respective loose material. To this end, the wheel 13a' (Fig. 5) may for instance be arranged so that it can shift or turn about the lower non-threaded portion of a spindle 15, while a preferably variable electric motor 16 adapted to shift in unison with said wheel 13a' about spindle 15 is drivingly connected to said wheel 13a' through any standard power conveying means such as worm 17a and worm wheel 17. The motor 16 is preferably bolted to the worm wheel 17.

The lower edge 14, 14a of the casing 7 or 7a respectively, along the picking up screw 1, 1a may during operation of the device practically touch the ground and may be formed as a sharp edge so as to support a clean picking up operation, i. e. practically scrape the respective bottom clean of the material to be conveyed. In order to be able easily to move the loader according to the invention over rough or even stony ground without risking damage to the lowermost edge of the casing or trough, the lower end of the device may selectively be lifted in any convenient manner, e. g. by means of the spindle 15 engaging a nut 18 connected to a bracket 19 which latter is fastened, e. g. by welding, to the casing or trough. The lower end of the spindle 15 is freely rotatably journalled in the worm wheel 20 which carries the electric motor 16. The worm wheel 20 is engaged by a manually operable worm 21 so that the fork 22 rigidly connected to the worm wheel 20 and carrying the wheel 13a can be adjusted and controlled for movement in any desired direction.

It is, of course, understood that the present invention is, by no means, limited to the particular construction shown in the drawings but also comprises any modifications within the scope of the appended claims.

What I claim is:
1. A device for picking up and conveying material, especially loose material, such as soil, sand, coal, gravel, stones, briquettes, and the like, which comprises in combination: conveying screw means having a first section adapted both to pick up and convey the respective material and having a second section adapted to receive the material from said first section and to lift and move said material to a discharge end of said second section, the screw spirals of said first section increasing in diameter toward said second section and being designed so that the respective lowermost points are arranged substantially along a first straight line, the lowermost points of the spirals of said second section being arranged along a substantially second straight line forming with said first straight line an obtuse angle, and trough means extending along said two sections up to the discharge end of said second section while being closely adjacent to the spirals of both sections for cooperation therewith, said trough means having a cutout at one side of said first section and having the lowermost edge of said cutout arranged substantially parallel to and slightly lower than the adjacent points of said first straight line, said lowermost edge of said cutout forming a scraper edge and being movable so as to be substantially parallel and close to the ground from which material is to be picked up by said first section.

2. A device for picking up and conveying material, especially loose material such as soil, sand, gravel, stones, briquettes, and the like, which comprises in combination: channel means, conveying screw means rotatably arranged in said channel means, said screw means having a first section adapted both to pick up and convey the respective material and having a second section adapted to receive the picked-up material from said first section and to lift it to a certain height, the screw spirals of said first section increasing in diameter toward said second section and having their respective lowermost spiral points arranged along a substantially straight line, said channel means having its inside closely adjacent to the spirals of both sections for cooperating therewith and having a cutout at one side of said first section, the lowermost edge of said cutout being substantially parallel to and slightly lower than the respective adjacent points of said line along which the lowermost spiral points of said first section are located, and supporting means tiltably supporting said channel means with said conveying screw means for selectively tilting the same about an axis transverse to the longitudinal axis of said conveying screw means from a rest position away from the ground to a working position adjacent the ground from which material is to be picked up, the lowermost edge of said cutout being tiltable into working position into close proximity of and parallel to a plane ground surface from which material is to be picked up.

3. A device for picking up and conveying material, especially loose material, such as soil, sand, coal, gravel, stones, briquettes, and the like, which comprises in combination: conveying screw means having a first section adapted both to pick up and convey the respective material and having a second section adapted to receive the picked-up material from said first section and to lift and move said picked-up material to a discharge end of said second section, the respective lowermost points of the screw spirals of said first section being located along a substantially straight line forming an acute angle with the longitudinal axis of said first section, channel means partly surrounding both sections in close relationship thereto, said channel means having a cutout on one side of said first section with the lowermost edge of said cutout substantially parallel to the line along which the lowermost spiral points are located, said lowermost edge being tiltable into a position in which said edge is substantially parallel to the adjacent ground and nearly scrapes the same, and driving means drivingly connected to said conveying screw means for rotating the same in a direction toward that side of said first section at which said cutout is located.

4. A device for picking up and conveying material, especially loose material, such as soil, sand, gravel, coal, stones, briquettes, and the like, which comprises in combination: conveying screw means having a first section adapted both to pick up and convey the respective material and having a second section adapted to receive the picked-up material from said first section and to lift the same to a certain height, the screw spirals of said first section increasing in diameter toward said second section and having their respective lowermost points arranged along a substantially straight line forming an acute angle with the longitudinal axis of said screw means, channel means housing said screw means and arranged for cooperation therewith, said channel means extending along said screw means and having a cutout at one side of said first section to allow picking up of the respective material by said first section, the lowermost edge of said cutout being substantially parallel to said straight line along which the lowermost spiral points of said first section are located and being movable into a position close and substantially parallel to the ground from which material is to be picked up by the spirals of said first section, and wheel means arranged at that side of said first section which is opposite said cutout.

References Cited in the file of this patent
UNITED STATES PATENTS

| | | |
|---|---|---|
| 1,721,392 | Heumann | July 16, 1929 |

FOREIGN PATENTS

| | | |
|---|---|---|
| 108,382 | Great Britain | Aug. 9, 1917 |
| 300,391 | Germany | Sept. 8, 1917 |
| 37,895 | Netherlands | Apr. 15, 1936 |